Patented Nov. 5, 1929

1,734,657

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

PYROXYLIN COMPOSITION

No Drawing.   Application filed September 12, 1925.   Serial No. 56,086.

My invention aims to provide a new composition of matter containing pyroxylin. It aims also to provide a new solvent for use conjointly with pyroxylin for the manufacture of lacquer, films, or various solutions of pyroxylin.

My new solvent consists of benzyl phthalate or some other aryl ester of a di- or polycarboxylic aromatic acid.

The use of certain alkyl esters of a dicarboxylic aromatic acid is already very important. Thus dibutyl phthalate is finding extensive application as a solvent. It is only slowly volatile and valuable, therefore, in pyroxylin lacquers. Amyl phthalate has been suggested as preferable because it evaporates even less rapidly from the film and remains more or less permanently in the film to keep it pliable and to prevent brittleness.

I substitute for the butyl or amyl radical, a radical of larger weight, to give a phthalate of higher molecular weight and, therefore, of higher boiling point. I use the benzyl radical, obtained by the chlorination of toluol to give benzyl chloride, $C_6H_5.CH_2.Cl$.

From benzyl chloride and sodium or potassium phthalate, the preparation of benzyl phthalate follows closely well known methods. I disclaim the method of production of the benzyl ester as no part of my invention.

I do claim, on the other hand, any composition containing both pyroxylin and a benzyl phthalate, either monobenzyl phthalate or the preferable dibenzyl phthalate.

An example of my invention is a lacquer of the following composition: 8 oz. of pyroxylin (containing 12% nitrogen) and 4 oz. of benzyl phthalate dissolved in a gallon of liquid containing 20% by volume of each of the volatile materials, ethyl alcohol, ethyl acetate, butyl acetate, butyl alcohol, and toluol.

All proportions as well as the kinds of volatile liquids are subject to considerable variation without departing from the spirit of my invention. Also, other well known ingredients may be added, such as a resin, a pigment, an ant-acid for the purpose of stabilizing the pyroxylin, and a softener of the nature of castor oil.

Also, the materials other than benzyl phthalate and pyroxylin may be changed, in a manner which will be obvious to one skilled in that particular art, to produce a composition suitable for the fabrication of plastics of the type of celluloid, for casting to give the base of picture film, for coating cloth to give leather substitute, or for miscellaneous purposes now served by pyroxylin solutions.

I do not limit my invention to any one use of my composition; neither do I wish to limit my invention to any one ester as the solvent. I may use instead of phthalic acid, as a material for the manufacture of my ester, any polycarboxylic acid of the aromatic series, by which I mean any aromatic acid that contains more than one carboxyl group to the molecule, such, for example, as phthalic acid, $C_6H_4(COOH)_2$, trimesic acid, $$C_6H_3(COOH)_3,$$

pyro-mellitic acid,  $C_6H_2(COOH)_4$, their isomers; homologs, or substitution products.

I include the esters of such acids not only with the benzyl radical but also with isomers, homologs, or substitution products of the benzyl radical.

I claim:—

1. A composition comprising pyroxylin and an aryl alkyl ester of a polycarboxylic aromatic acid.

2. A composition comprising pyroxylin and an aryl alkyl ester of a dicarboxylic aromatic acid.

3. A composition comprising pyroxylin and an aryl alkyl ester of phthalic acid.

4. A composition of matter comprising pyroxylin and a benzyl ester of a polycarboxylic aromatic acid.

5. A composition of matter comprising pyroxylin and a benzyl ester of a dicarboxylic aromatic acid.

6. A composition of matter comprising pyroxylin and a benzyl ester of phthalic acid.

7. A composition of matter comprising pyroxylin and dibenzyl phthalate.

8. A composition of matter suitable for use as a lacquer comprising pyroxylin and dibenzyl phthalate.

9. A solvent for pyroxylin comprising an aryl alkyl ester of a polycarboxylic aromatic acid.

10. A lacquer composition comprising a mixture of pyroxylin, a resin, butyl acetate, butanol, toluol, and dibenzyl phthalate.

In testimony, that I claim the foregoing as my own, I have hereto affixed my signature.

R. H. VAN SCHAACK, Jr.